United States Patent [19]

Weitzenhof et al.

[11] Patent Number: 5,588,509

[45] Date of Patent: Dec. 31, 1996

[54] SPLINED VIBRATION DAMPING DEVICE USING ER FLUIDS

[75] Inventors: David A. Weitzenhof, Bath, Ohio; Isao Watanabe, Iruma, Japan; Carmen S. Santa Maria, Uniontown; William S. Niaura, Akron, both of Ohio; Gareth H. McKinley, Ayer, Mass.

[73] Assignee: Bridgestone/Firestone, Inc., Akron, Ohio

[21] Appl. No.: 544,079

[22] Filed: Oct. 17, 1995

[51] Int. Cl.$^6$ .................................... F16F 15/03
[52] U.S. Cl. .................. 188/267; 188/299; 188/322.19
[58] Field of Search ........................ 188/267, 269, 188/299, 322.5, 322.19; 267/140.14, 140.15; 280/707, 714

[56] References Cited

U.S. PATENT DOCUMENTS

| | | | |
|---|---|---|---|
| 4,351,515 | 9/1982 | Yoshida | 188/267 |
| 4,585,099 | 4/1986 | Taylor | 188/322.19 |
| 4,819,772 | 4/1989 | Rubel | 188/299 |
| 4,858,733 | 8/1989 | Noguchi | 188/267 |
| 4,896,752 | 1/1990 | Shtarkman | 188/299 |
| 5,000,299 | 3/1991 | Goto et al. | 188/312 |
| 5,014,829 | 5/1991 | Hare, Sr. | 188/267 |
| 5,018,606 | 5/1991 | Carlson | 188/267 |
| 5,076,403 | 12/1991 | Mitsui | 188/267 |
| 5,161,653 | 11/1992 | Hare, Sr. | 188/267 |
| 5,170,866 | 12/1992 | Ghaem | 188/317 |
| 5,180,145 | 1/1993 | Watanabe et al. | 188/64.24 |
| 5,259,487 | 11/1993 | Petek | 188/267 |
| 5,277,281 | 1/1994 | Carlson et al. | 188/267 |
| 5,316,112 | 5/1994 | Kimura et al. | 188/267 |
| 5,366,048 | 11/1994 | Watanabe et al. | 188/267 |
| 5,477,946 | 12/1995 | Kawamata et al. | 188/267 |

FOREIGN PATENT DOCUMENTS

| | | | |
|---|---|---|---|
| 0552568 | 12/1992 | European Pat. Off. | F16F 9/53 |
| 6066342 | 3/1994 | Japan | 188/267 |
| 2255150 | 10/1992 | United Kingdom | 199/267 |

OTHER PUBLICATIONS

Nicholas K. Petek et al., "Demonstration of an Automotive Semi-Active Suspension Using Electrorheological Fluid" Society of Automotive Engineers Paper No. 950586 (1995).

*Primary Examiner*—Robert J. Oberleitner
*Assistant Examiner*—Chris Schwartz
*Attorney, Agent, or Firm*—Carmen S. Santa Maria

[57] ABSTRACT

A vibration damping device for mounting between two spaced portions of a vehicle. An inner metal cylindrical housing forms an internal piston chamber and is connected at one end to the vehicle, with a piston which is slidably mounted within the piston chamber, being connected to another portion of the vehicle. An outer housing surrounds a portion of the inner housing and forms a fluid duct or flow channel between fluid chambers formed on opposite sides of the piston. An electrode is mounted in the fluid duct for applying a voltage across the duct to affect the viscosity of an electrorheological (ER) fluid flowing therethrough to increase the damping force of the device. The electrode includes a plurality of circumferentially spaced splines and intervening grooves extending longitudinally along the fluid duct. The bottom portions of the grooves have a decreased electric field applied thereto than do the splines, providing bleed grooves or leak paths for the ER fluid to decrease the shear-rate of the fluid. The inner housing has elongated projections which extend into the grooves of the electrode to provide a more uniform electric field along the fluid duct to control the amount of leakage through the bleed grooves. A secondary electrode ground may be formed in the grooves to control the electric field in the bleed grooves.

17 Claims, 5 Drawing Sheets

SPLINED VIBRATION DAMPING DEVICE USING ER FLUIDS

BACKGROUND OF THE INVENTION

1. Technical Field

The invention relates to vibration damping devices which develop damping performance when being applied to a suspension member, such as for automobiles or other equipment. More particularly, the invention relates to such a damping device using an electrorheological (ER) fluid as the damping medium, which device is of a relatively simple structure, easy to assemble and to apply a voltage to the ER fluid contained therein for changing the damping characteristics of the device. Even more particularly, the invention relates to an ER damper in which one or both of the electrodes have a splined or fluted configuration.

2. Background Information

Vibration damping devices have been used for considerable periods of time to dampen the vibrational forces applied to the suspension system of vehicles to provide a smoother ride by reducing the vibrations caused by road bumps and depressions passing from the tires to the vehicle frame by the interposing of oil-filled shock absorbers or high-pressure gas damping devices.

Although these prior art oil and high-pressure gas damping devices have proven satisfactory, a more recent development has evolved in which an electrorheological or electroviscous fluid is used within the chamber of the damping device, wherein the liquid is in contact with one or more electrodes, usually mounted in a restrictive passage, which depending upon the size of the electrodes and the amount of voltage applied to the liquid, will change the viscosity of the liquid, enabling the damping device to have a greater range of damping characteristics than those achieved by the high-pressure gas or oil-filled shock absorbers.

An example of an anti-vibration device which uses an expandable liquid chamber containing an electrorheological fluid is shown in U.S. Pat. No. 4,973,031. U.S. Pat. No. 4,858,733 discloses another damping device using electrodes in combination with an electroviscous liquid contained within closed chambers. The liquid is movable through a restricted passage where voltage is applied to the electroviscous liquid as it moves through the passage to change its viscosity to achieve various damping effects. Various other types of such ER vibration damping devices use elastomeric members or sleeves for containing the ER fluid, such as shown in U.S. Pat. No. 5,180,145. Although these devices have proved satisfactory, they are limited as to the amount of internal pressures available for damping, since the sleeves expand and affect the response time.

Therefore, the use of rigid fluid chambers formed of metal have been utilized with ER fluids in order to be able to develop higher internal pressure and quicker response times. U.S. Pat. Nos. 4,819,772 and 5,259,487 are believed to be the closest prior art to the vibration damping device of the present invention. The damping devices of both of these patents use an ER fluid which is contained within rigid housings to provide for increased pressures and quicker response time not believed obtainable with ER dampers using an elastomeric sleeve or bellows for the chamber-forming member.

However, the structures of both of these prior art damping devices require a complicated structure consisting of numerous parts in order to achieve the electrical isolation required for applying a voltage to the restricted orifices or ducts through which the ER fluid moves, and requires the passage of the wires applying the voltage to the electrode to pass through the ER fluid chamber. Likewise, the outer body or housing must be of a rigid metal, since this outer housing is connected at one end directly to one of the spaced vehicle components, and therefore must be of sufficient strength to support the various loads and forces applied thereto. An outer end of the piston rod is connected to the other of the spaced vehicle components for mounting the vibration damping device on the vehicle.

Another problem that can exist in dampers using ER fluids is that the constricted areas adjacent the electrodes can cause a high shear-rate in the restricted flow channel, thereby decreasing the difference between field-on and field-off damping force values provided by the ER effect. Some of these problems are eliminated by the providing of bleed holes or check valves in the piston.

Thus, the need exists for an improved vibration damping device using ER fluids which is of a simpler construction, which is able to withstand the various loads and forces exerted thereon when mounted between spaced structural components of a vehicle, and which enables a voltage to be applied to the electrode contained within the damping device in an easier manner than existing ER fluid dampers, and which reduces the high shear-rate in the flow channel.

SUMMARY OF THE INVENTION

Objectives of the invention include providing a damping device using ER fluids, preferably of the type adapted to be incorporated within a vehicle suspension system, which solves the aforementioned problems of prior art dampers by reducing the complexity of the damper without sacrificing the damping characteristics achieved thereby.

A still further objective of the invention is to provide such a damping device which, when used with an electrorheological or electroviscous fluid, enables the orifice and associated electrode to have various configurations in order to achieve various damping characteristics.

Another objective of the invention is to provide such a damping device which is of a considerably simpler structure than prior dampers using ER fluids, and which is able to withstand the various loads and forces exerted thereon when mounted between spaced components in a vehicle suspension system.

A further objective of the invention is to provide such a damping device in which the electrode for supplying voltage to the ER fluid is mounted outwardly of the ER fluid to eliminate the passing of the electrical wires, which supplies the voltage to the electrode, through the ER fluid, as in prior dampers using ER fluids.

A still further objective of the invention is to provide such a damping device which incorporates a pressurized gas reservoir within the damper to prevent cavitation and the formation of bubbles within the ER fluid, thereby preventing the creation of electrical arcing within the fluid.

Still another objective of the invention is to provide such a damper in which the outer housing can be formed of a dielectric material, with the inner housing which forms the piston chamber being formed of metal, thereby enabling smaller diameter cylinders to be used, and to enable all metal components of the damper except for the electrode, to be grounded, to reduce the risk of electrical shorts or shocks.

A further objective of the invention is to provide a damper which reduces the shear-rate in the flow channel by providing small bleed grooves in the flow channel to relieve high hydraulic pressure and to prevent harshness in the vehicle, and to give extra flow area to decrease shear-rate of the ER fluids by providing a fluted or splined electrode configuration throughout all or a part of the flow channel.

Another objective of the invention is to provide a damper having a fluted or splined outer electrode and a similar-shaped inner electrode, wherein ridges formed on the inner electrode are positioned opposite of the valleys of the hot or outer electrode to form small bleed grooves in the valleys of the electrodes, and to provide a secondary ground electrode to provide an additional electric field between the peaks and flutes and the ground electrode to allow the valleys of the flutes to be electrified, thereby reducing the amount of electric field leakage.

Still another objective of the invention is to provide such a damping device which can be easily assembled and disassembled for repair and ease of manufacture without sacrificing the integrity of the device.

A further objective of the invention is to provide such an improved damping device which is of a rugged, compact, relatively lightweight, simple design, which achieves the stated objectives in a simple and efficient manner.

These objectives and advantages are obtained by the vibration damping device of the present invention, the general nature of which may be stated as including an inner housing forming a piston chamber; a piston axially movable within the piston chamber and dividing said chamber into two separate fluid chambers, said piston having a piston rod extending out of said inner housing; an outer housing surrounding at least a portion of the inner housing; first means for connecting the piston rod to a first support structure; second means for connecting one of the housings to a second structure spaced from the first structure, whereby load on said damping device is supported by said one housing and the piston rod; fluid transfer duct means formed between said inner and outer housings providing fluid communication between said fluid chambers on opposite sides of said piston, said fluid chambers adapted to be filled with an electrorheological (ER) fluid; and electrode means mounted in the transfer duct means for applying an electric field across at least a portion of the duct means to increase the flow resistance of the ER fluid passing therethrough, said electrode means being formed with a plurality of circumferentially spaced splines and intervening grooves extending longitudinally throughout at least a portion of the duct means.

BRIEF DESCRIPTION OF THE DRAWINGS

Preferred embodiments of the invention, illustrative of the best modes in which applicants have contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

A first embodiment of the improved vibration damping device is indicated generally at 1, and is shown in FIGS. 1–5. Device 1 includes an inner housing 2 formed of a rigid metal having an elongated, generally cylindrical body 3 with inner and outer cylindrical surfaces 4 and 5, respectively. One end of cylindrical body 3 is open at 6, with the other end being closed by a wall 7.

Figure 1:
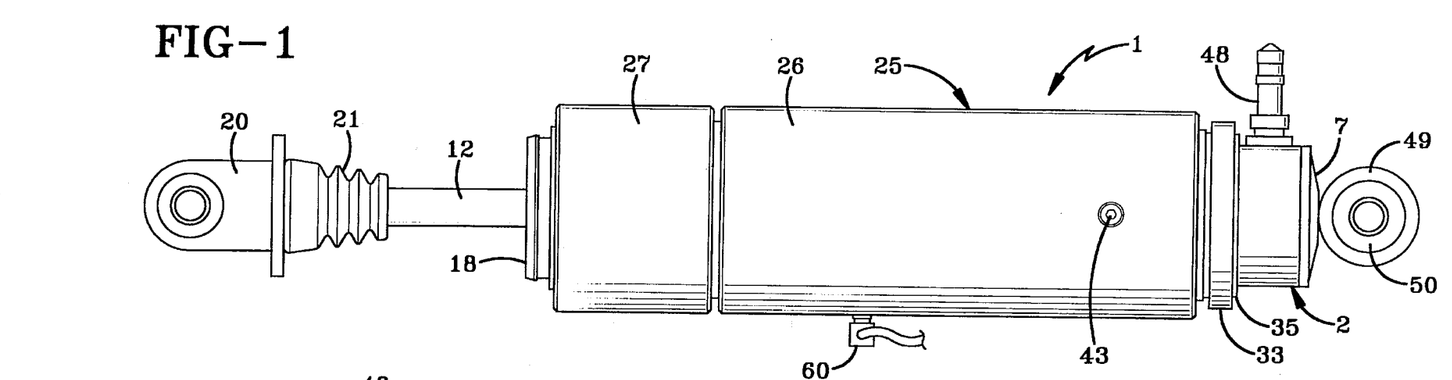
FIG. 1 is a side elevational view of the vibration damping device of the present invention.
Figure 3:
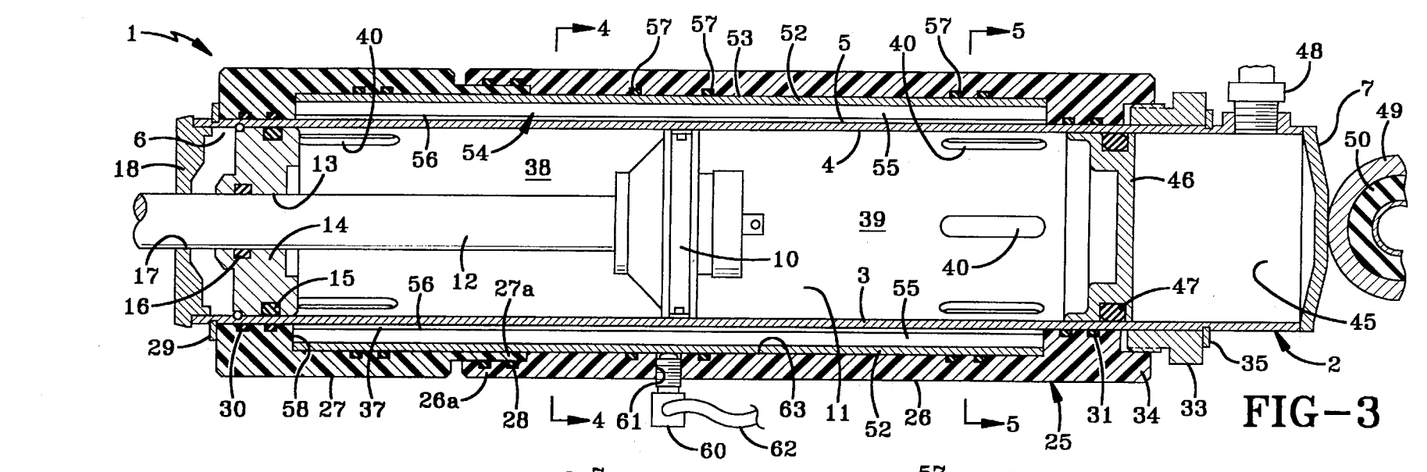
FIG. 3 is an enlarged fragmentary longitudinal sectional view of the damping device of FIG. 1.
Figure 4:
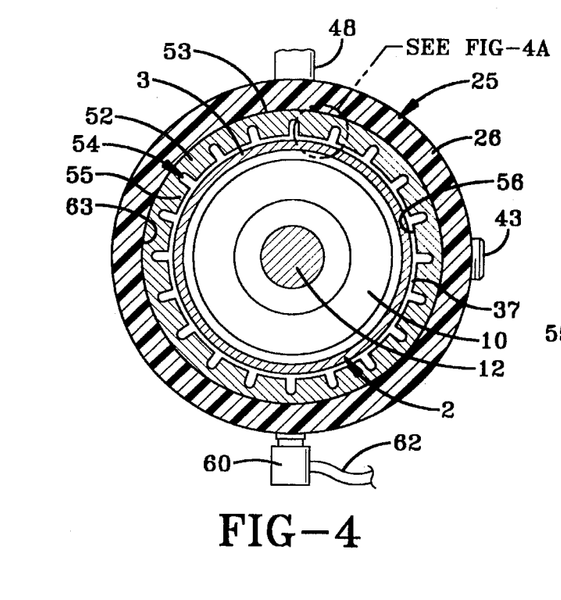
FIG. 4 is a sectional view taken on line 4—4, FIG. 3.
Figure 4A:
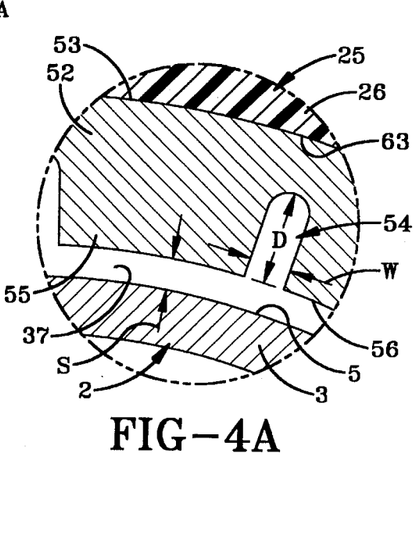
FIG. 4A is a greatly enlarged fragmentary sectional view of the encircled portion of FIG. 4.
Figure 5:
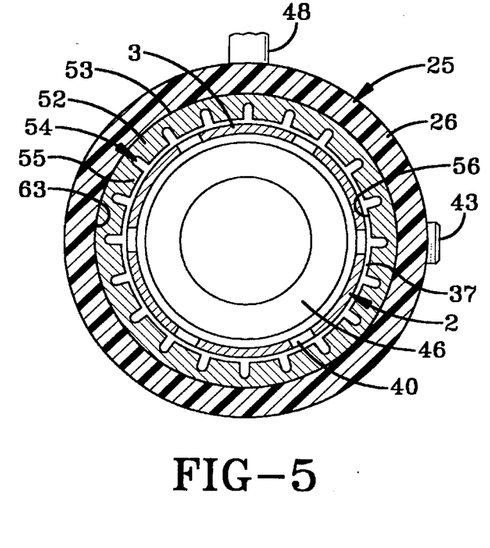
FIG. 5 is a sectional view taken on line 5—5, FIG. 3.
Figure 6:
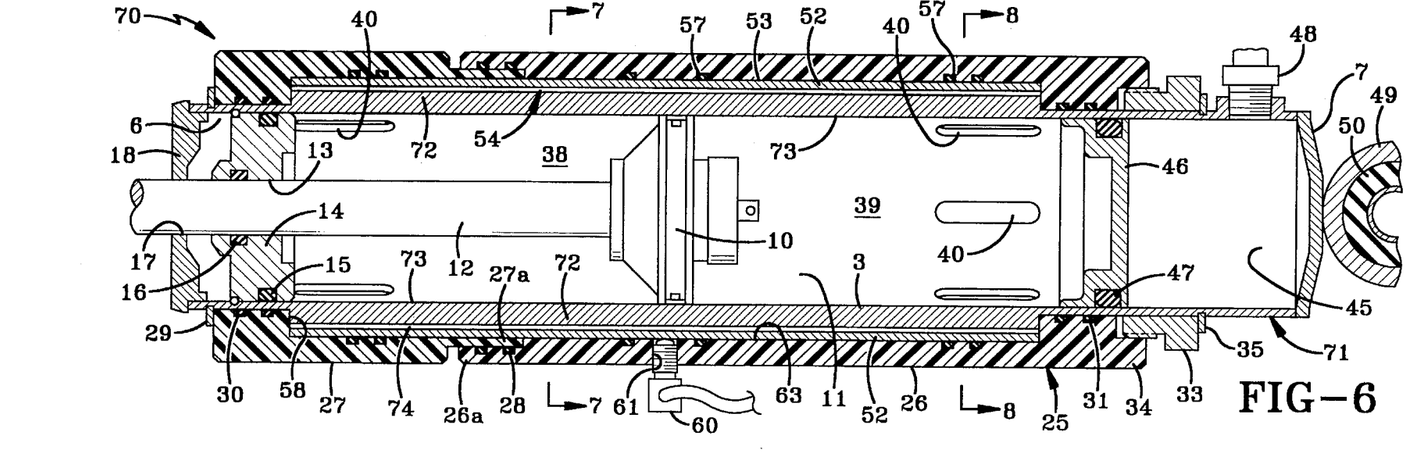
FIG. 6 is a fragmentary longitudinal sectional view similar to FIG. 3 of a second embodiment of the vibration damping device of the present invention.

A piston 10 is slidably mounted within a piston chamber 11 formed within cylindrical body 3, and has a piston rod 12 attached thereto. Rod 12 extends through a complementary-shaped opening 13 formed in an end closure ring 14. Ring 14 is mounted within open end 6 of cylindrical body 3, and is sealingly engaged therewith by an outer O-ring 15 and an inner O-ring 16. Piston rod 12 also extends through a complementary-shaped opening 17 formed in an end cap 18. As shown in FIG. 1, a connector 20 is mounted on the outer end of piston rod 12 for securing the piston rod to a vehicle component. A usual jounce bumper 21 will be mounted on piston rod 12 adjacent connector 20 for absorbing severe forces exerted on vibration damper 1 to prevent damage thereto upon the vehicle experiencing severe depressions or bumps in a road surface.

Damper 1 further includes an outer housing, indicated generally at 25, which in the embodiment of FIGS. 1–5 is formed of a dielectric material, such as various types of high-strength plastic materials. Housing 25 preferably is formed of two cylindrical portions 26 and 27 which are axially telescopically joined at their inner ends 26a and 27a, and fluidly sealed by a pair of O-rings 28.

The outer end of cylindrical portion 27 is secured in position on inner housing 2 by a clip ring 29, and is sealingly engaged with the outer surface of housing 2 by a spaced pair of O-rings 30. The outer end of cylindrical portion 26 is also sealingly engaged with the outer surface of inner housing 2 by a spaced pair of O-rings 31. Cylindrical portions 26 and 27 of outer housing 25 are slidably mounted and assembled on inner housing 2, and secured in an adjusted position by an adjustment screw ring 33 which is threadably engaged with an internally threaded portion 34 at the outer end of cylindrical housing portion 26. Screw ring 33 is retained in position by a clip ring 35.

Figure 2:
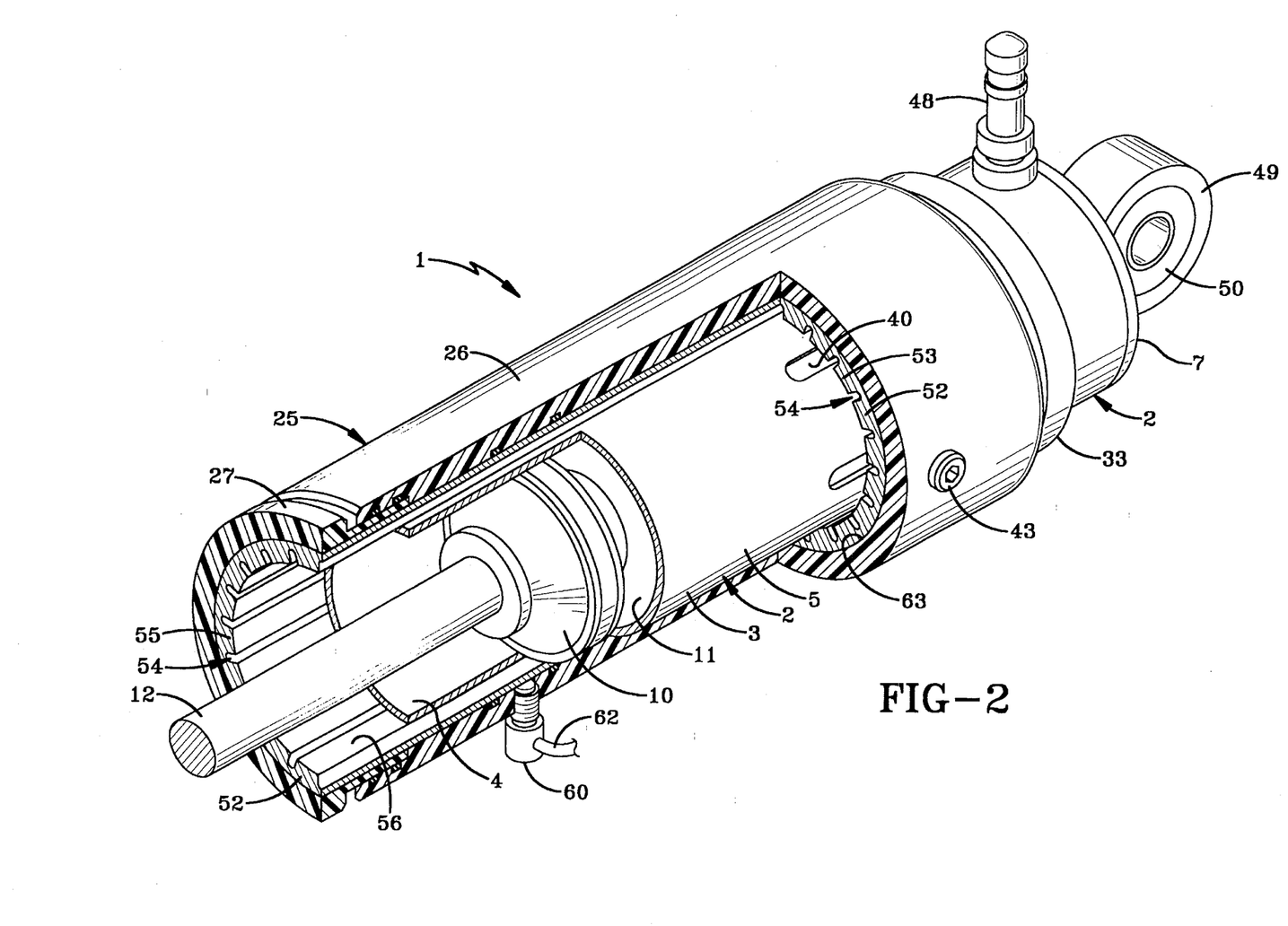
FIG. 2 is an enlarged fragmentary perspective view, with portions broken away and in section, of the vibration damping device shown in FIG. 1.

The outer diameter of inner cylindrical housing 2 is less than the inner diameter of outer housing 25 in order to provide an annular fluid transfer duct 37 therebetween (FIG. 3), which duct extends generally throughout the axial length of outer housing 25. Piston 10 divides chamber 11 into a pair of fluid chambers 38 and 39, which communicate with transfer duct 37 by a plurality of elongated slots 40 formed in cylindrical body 3 of housing 2. Thus, as shown in FIGS. 2 and 3, as piston 10 moves within chamber 11, an electrorheological (ER) fluid which is contained within chamber 11 will flow through openings 40 and along transfer duct 37 between the two fluid chambers, depending upon the direction of movement of the piston. A hole is formed in outer housing 25 and communicates with fluid transfer duct 37 in order to fill piston chamber 11 and transfer duct 37 with an ER fluid. A threaded plug 43 will seal the fill hole after filling of damper 1 with an ER fluid.

A pressure chamber 45 is formed in one end of inner housing 2 and is separated from piston chamber 11 by an axially slidably mounted piston or partition wall 46 which is fluidly sealed from chamber 11 by an O-ring 47. Chamber 45 will be filled with a pressurized compressible gas. Upon movement of piston 10 within chamber 11, wall 46 will move into and away from chamber 45 to compensate for the change of volume within chamber 11 caused by the movement of piston rod 12 into and out of the chamber. This movement of wall 46 will maintain a generally constant pressure within the ER fluid to prevent the formation of air bubbles or cavitation, which could cause electrical arcing and shorting when a voltage is applied to the ER fluid, as described below. A valve 48 communicates with pressure chamber 45 for supplying the pressurized gas into the chamber.

A connector 49 is rigidly secured by welds to end closure wall 7 of inner housing 2 for mounting the vibration damper on another portion of a vehicle spaced from that portion of the vehicle to which piston rod connector 20 is attached. An elastomeric bushing 50 preferably is mounted within connector 49 to assist in absorbing small vibrations imparted on the vehicle and damper to assist in achieving the desired damping characteristics.

An electrode 52 is mounted within fluid transfer duct 37 adjacent the inner cylindrical surface of outer housing 25. Electrode 52 is a cylindrical metal band or sleeve having a cylindrical outer surface 53 which coincides with the cylindrical surface of outer housing 25. As shown in FIG. 3, electrode 52 preferably extends throughout the axial length of fluid transfer duct 37, although it could occupy only portions thereof without affecting the concept of the invention. In accordance with one of the features of the invention, electrode 52 is formed with a plurality of circumferentially spaced, longitudinally extending grooves 54 (FIGS. 4–5), which form longitudinally extending intervening splines 55. Each spline 55 has an arcuate outer surface 56 (FIG. 4A) which is spaced from outer cylindrical surface 5 of inner housing 2 by a distance (S) which defines a portion of transfer duct 37.

Electrode 52 is seated in an annular recess 63 formed in the inner surface of outer housing 25 and is clamped in position by an inner edge 58 of outer housing cylindrical portion 27 upon the advancement of cylindrical portion 26 toward portion 27 by adjustment screw ring 33 (FIG. 3). A voltage is supplied to electrode 52 by an electrical connector 60, which extends through a complementary-shaped opening 61 formed in outer housing 25, and which is connected to a voltage source by a wire 62. Electrode 52 is sealingly mounted within outer housing 25 by a plurality of O-rings 57.

In the preferred embodiment, electrode 52 will have between eight and sixteen splines 55 formed equally and circumferentially spaced, with the width (W) (FIG. 4A) of each groove 54 being within the range of 0.5 mm and 1 mm, which is approximately equal to the radial width of fluid transfer duct 37, indicated at (S). The depth of each groove 54, indicated at (D), is preferably between 1 mm and 3 mm. These parameters are believed to provide the most satisfactory results, but may change without materially affecting the concept of the invention and the advantages achieved thereby. It has been found that in order to maintain a constant viscous damping force for a damper system of given circumferential length and axial length (L) operating at fixed velocity ($U_p$) with a fixed fluid viscosity ($\mu$), then the geometric relationship between the circumferential width (W) of N grooves 54 having a radial depth (D) and radial spacing (S) and a tangential spacing (b), where (b) is the distance between the centerline of any two adjacent splines at the cylinder defined by the fluid transfer duct opening, is given by:

$$NS^3[(W/S)^{3*}(D+S)+B] \cong K$$

where K is a constant value determined by selected values of N, S, D and b.

It has been found that one of the advantages achieved by vibration damping device 1, and, in particular, by the use of the fluted or splined electrode 52, is that the root or base of the grooves 54 provide small bleed grooves throughout the length of the fluid transfer duct, which heretofore had to be obtained by placing such bleed holes in the piston. These bleed grooves relieve excessively high hydraulic pressure, which is developed during movement of the piston, to prevent harshness in the vehicle ride. The bleed grooves also give extra flow area to decrease shear rate of ER fluids. This decreased shear rate is believed to increase the ER effect, namely, the damping force difference between the voltage ON and OFF.

The operation of vibration damper 1 is best illustrated in FIG. 3. Upon the vehicle experiencing a depression or protrusion in the roadway, the piston will move within chamber 11, forcing the ER fluid from one chamber into the other chamber via fluid transfer duct 37. When passing through duct 37 adjacent electrode 52 which has a voltage applied thereto, the viscosity of the ER fluid will be changed, depending upon the amount of voltage applied and the width of transfer duct 37 and depth of grooves 54 to affect the damping characteristics of the damper, as is well known in the ER fluid damping art.

Inner housing 2, which is formed of rigid metal, and which provides the ground electrode, and piston rod 12, are mounted on the vehicle at spaced locations and support the weight and absorb the various forces exerted on the damper. This enables outer housing 25 to be formed of a dielectric lightweight, preferably plastic material, since it need not absorb any of the forces and loads as do the outer housings or cylinders of prior art ER vibration dampers. Inner metal housing 2 will be connected to ground, with only electrode 52 being electrified, which electrode is completely contained within a dielectric housing. The only external electrical connection is electrical connector 60 and wire 62. Thus, all electrified components are substantially out of possible contact with individuals and/or surrounding components of the vehicle. Likewise, as described above and shown in FIG. 3, very few components are required to form damper 1, which is easily assembled by the slip joinder of the outer housing cylindrical portions over the inner metal housing and their clamping engagement with electrode 52 through the adjustment of screw ring 33.

A second embodiment of the vibration damping device of the present invention is indicated generally at 70, and is shown in FIGS. 6–9. Damper 70 is similar in most respects to damper 1 discussed above, except that the inner housing, indicated generally at 71, is formed with a plurality of longitudinally or axially extending projections or ridges 72 (FIG. 9) which are adapted to extend into grooves 54 of hot electrode 52. Inner housing 71 is formed of metal and includes a cylindrical inner surface 73 which is slidably engaged by piston 10, as discussed previously. The principal difference between dampers 1 and 70 is the formation of projections 72, which are spaced equally circumferentially about the outer surface of housing 71, and extend into grooves 54, as indicated above. This construction provides for a more even electric field being applied throughout the fluid transfer duct 74, in contrast to the less uniform electric field of damper 1. However, fluid transfer duct 74 of damper 70 does not provide the bleed grooves as does damper 1 discussed above.

Figures 7, 8, 9:
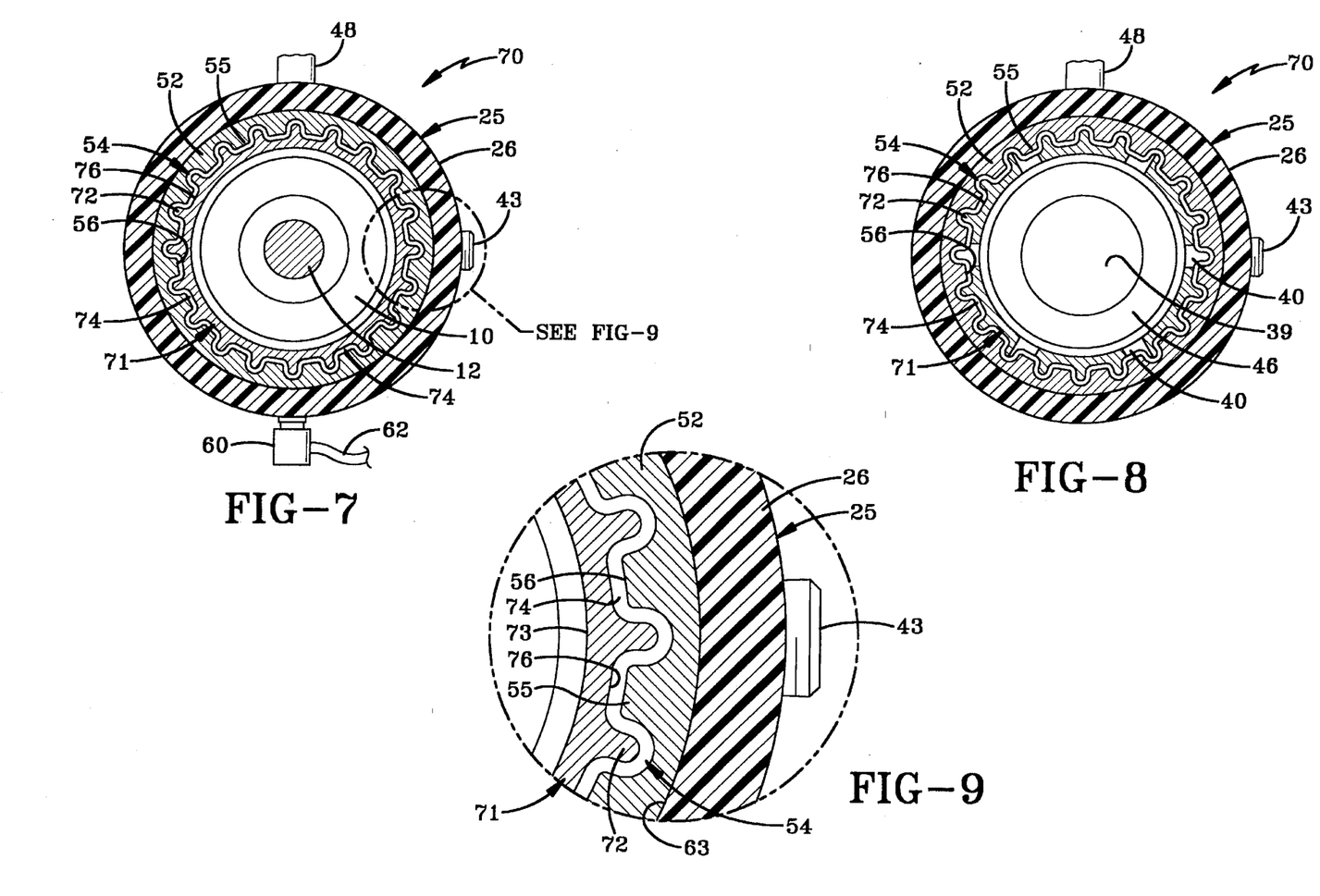
FIG. 7 is a sectional view taken on line 7—7, FIG. 6.
FIG. 8 is a sectional view taken on line 8—8, FIG. 6.
FIG. 9 is an enlarged fragmentary sectional view of the encircled portion of FIG. 7.

The operation and effects achieved by damper 70 are generally similar to that discussed above, with the exception of the elimination of the bleed grooves. In damper 70, the distance between projections 72 and the portions of electrode 52 which form grooves 54 is preferably constant, which also is equal to the radial distance between the outer arcuate surfaces 56 of splines 55 with respect to the arcuate surfaces 76 formed between adjacent projections 72.

Electrode 52, as well as inner housing 71, as in damper 1, preferably extends throughout the axial length of fluid transfer duct 74 and provides a uniform continuous cross-sectional area to the fluid transfer duct. However, for certain applications, it may be desirable to shorten the length of outer electrode 52 and the fluted or grooved areas provided by inner housing projections 72.

Figures 10, 11, 12:
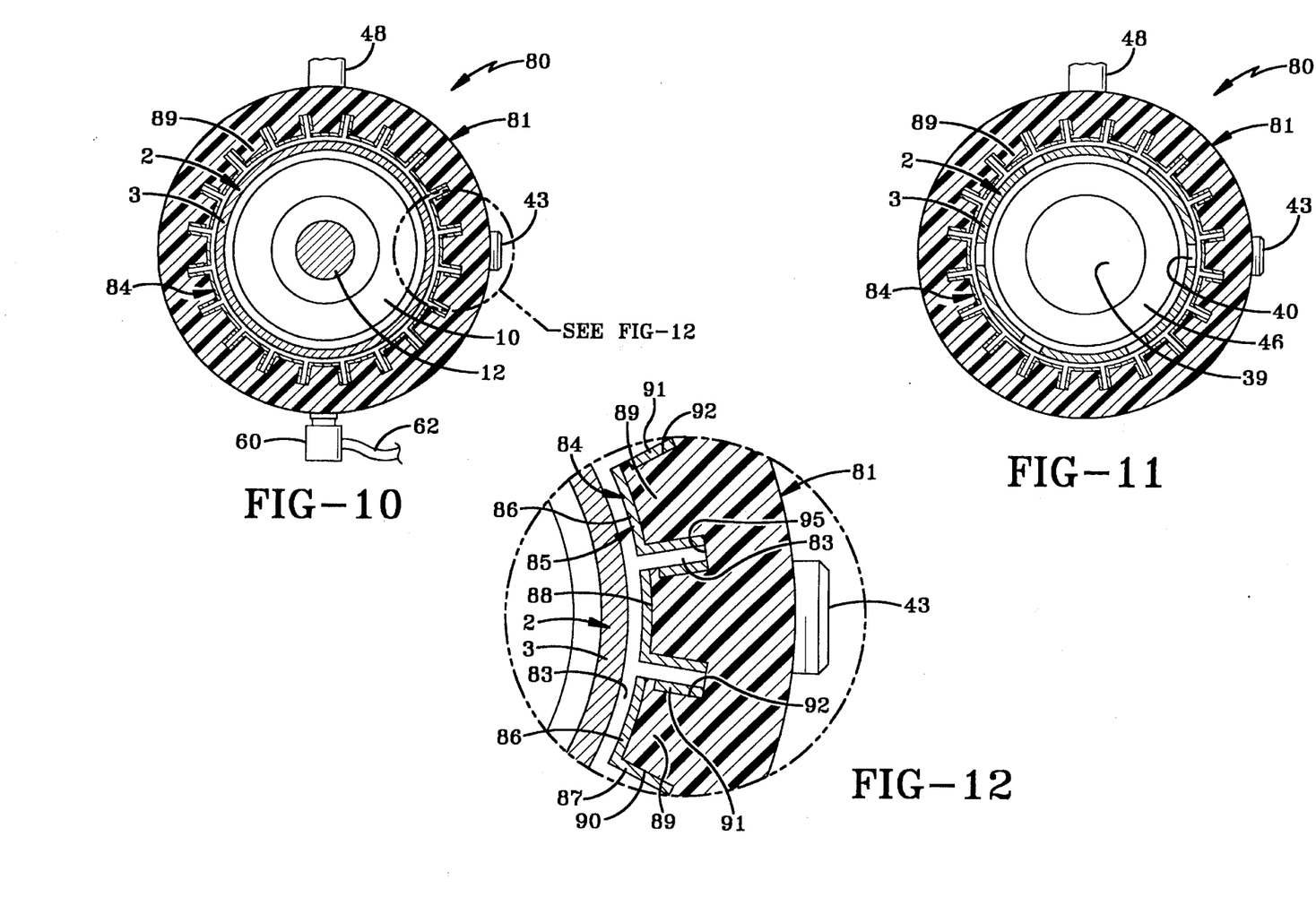
FIGS. 10 and 11 are sectional views similar to FIGS. 4–5 and 7–8, respectively, of a third embodiment of the vibration damping device of the present invention.
FIG. 12 is an enlarged fragmentary sectional view of the encircled portion of FIG. 10.

A third embodiment of the present invention is indicated generally at 80, the details of which are shown in FIGS. 10–12. Damper 80 is similar to damper 1 described above, with the exception that the outer housing 81, which also is formed of a dielectric material, is machined or formed with a plurality of longitudinally or axially extending grooves 82, preferably throughout the longitudinal or axial length of a fluid transfer duct 83 formed between outer housing 81 and inner cylindrical housing 2. In this construction, the outer or hot electrode, indicated generally at 84, is formed by a plurality of somewhat L-shaped metal strips 85 which extend throughout the length of duct 83. Each strip 85 includes an arcuate leg 86 and a radially outwardly extending leg 87. Arcuate leg 86 is mounted adjacent the inner arcuate surface 88 of the spline-like projections 89 formed in outer housing 81 by grooves 82. Radial leg 85 extends along a side wall 90 of each groove 82.

A plurality of elongated longitudinally extending metal strips 91 are seated within a complementary-shaped recess 92 formed in each wall 93 of groove 82 opposite strip leg 87. Strip 91 is electrically isolated from the adjacent L-shaped metal strip 85 and is connected to ground.

The assembly of L-shaped metal strips 85 and metal strips 91 forms a splined or fluted electrode configuration as that provided in dampers 1 and 70, and as with dampers 1 and 70, when voltage is applied, an electric field is formed between the peaks of the splines or flutes and the opposed ground electrode provided by inner housing 2. However, the presence of the secondary ground electrodes provided by metal strips 91, allows the valleys of the flutes to be electrified, thereby reducing and controlling the amount of leakage or bleed of the fluid through the grooves of the valleys, as occurs in damper 1 described above. This configuration provides some leakage or bleed grooves for the ER fluid, as occurs in damper 1, but provides control thereof. Although grooves 82 are shown as having generally flat bottom surfaces 95, they can be curved as shown in grooves 54 in dampers 1 and 70, discussed above without affecting the results achieved thereby.

Also, the number of grooves 82 and their width and depth can vary, depending upon the particular damping characteristics desired to be achieved by the damper having the electrode configuration shown in FIGS. 10–12, and, in particular, the secondary grounded electrodes provided by strips 91, without affecting the concept of the invention.

The voltage may be applied to L-shaped metal strips 85, which form the hot electrode, by a variety of structures, one example of which would be an energized ring (not shown) mounted at one or both ends of fluid duct 83.

In summary, the various embodiments provide for a vibration damping device intended for use with an ER fluid, which device is of a relatively simple construction, easy to assemble and mount on a vehicle, and in which the fluid transfer duct can have various configurations. Another advantage of the present invention is that the electrical connection to the electrode need not pass through the ER fluid as in prior ER dampers, and requires that only the electrode sleeve be connected to a source of voltage. This provides a damper less susceptible to malfunction due to arcing or short circuiting of the applied voltage since the inner housing which is formed of metal, is connected to ground, and the outer housing can be formed of a dielectric insulating material, requiring only passage of the electrical connector through the outer housing to connect the internally located and electrically isolated electrode sleeve to an exterior voltage supply.

Furthermore, dampers 1, 70 and 80 provide for a fluted or splined electrode configuration which has nonannular fluid ducts in order to provide bleed grooves to relieve excessively high hydraulic pressure to prevent harshness in the vehicle ride. The bleed grooves also give extra flow area to decrease shear rate of ER fluids, which is believed to increase the ER damping effect. Furthermore, the use of secondary ground electrode strips 91 in damper 80, provides more control for the bleed grooves formed in the valleys of the grooves formed between the splines of the electrode.

Accordingly, the vibration damping device of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved vibration damping device is constructed and used, the characteristics of the construction, and the advantageous, new and useful results obtained; the new and useful structures, devices, elements, arrangements, parts and combinations, are set forth in the appended claims.

We claim:

1. A vibrating damping device including:

a metal inner housing forming a piston chamber;

a piston axially movable within the piston chamber and dividing said chamber into two separate fluid chambers, said piston having a piston rod extending out of said inner housing;

an outer housing formed of a dielectric material surrounding at least a portion of the inner housing;

first means for connecting the piston rod to a first support structure;

second means for connecting one of the housings to a second structure spaced from the first structure, whereby a load on said damping device is supported by said one housing and the piston rod;

fluid transfer duct means formed between said inner and outer housings providing fluid communication between said fluid chambers on opposite sides of said piston, said fluid chambers adapted to be filled with an electrorheological (ER) fluid;

metal electrode means mounted in the outer housing and located adjacent the transfer duct means, said electrode means being formed with a plurality of circumferentially spaced splines and intervening grooves extending longitudinally along and adjacent an inner surface of the outer housing throughout at least a portion of the duct means; and electrical connector means extending through the outer housing and electrically connected to the electrode means for applying the electric field across a portion of the duct means to increase the flow resistance of the ER fluid passing therethrough.

2. The vibration damping device defined in claim 1 in which the electrode means includes a metal sleeve mounted adjacent the inner surface of the outer housing adjacent the fluid duct means; and in which the electrical connection means is electrically connected to said sleeve for applying an electrical voltage on said electrode means.

3. The vibration damping device defined in claim 2 in which the electrode means sleeve has a cylindrical inner surface; and in which the grooves are formed in said sleeve and extend radially into said sleeve from said inner surface, whereby intervening portions of said inner surface between adjacent pairs of grooves form the splines.

4. The vibration damping device defined in claim 3 in which the inner housing is formed with a plurality of projections extending longitudinally along an outer surface of said inner housing; and in which said projections extend into certain of the grooves of the electrode means sleeve.

5. The vibration damping device defined in claim 1 in which the electrode means includes a plurality of elongated first metal strips which form the splines; and in which a plurality of second metal strips are mounted in a plurality of the grooves and are electrically insulated from said first strips to provide a plurality of secondary electrodes.

6. The vibration damping device defined in claim 5 in which each of the first metal strips includes an arcuate section which is spaced radially from the inner housing, and a second section which extends into a respective one of the adjacent grooves; and in which said second sections are spaced circumferentially from the second metal strips to provide a gap therebetween.

7. The vibration damping device defined in claim 1 in which a pressurized gas reservoir is formed within the inner housing adjacent the second end of said housing.

8. The vibration damping device defined in claim 1 including a movable partition means mounted within the inner housing for separating the gas reservoir from the fluid chambers.

9. The vibration damping device defined in claim 1 in which the grooves have a width of between 0.5 mm and 1.0 mm and a depth of between 1.0 mm and 3.0 mm.

10. The vibration damping device defined in claim 1 in which the fluid transfer duct means has a radial spacing (S) substantially equal to a circumferential width (W) of the grooves.

11. The vibration damping device defined in claim 1 in which the annular fluid duct means has a substantially constant cross-sectional area throughout its longitudinal length.

12. The vibration damping device defined in claim 1 in which the relationship of a circumferential width (W) of the grooves, a radial depth (D) of the grooves, the radial spacing (S) of the fluid transfer duct between the inner housing and splines, a number (N) of the grooves, and a tangential spacing of the grooves (b) is defined by the formula $NS^3=K$ where K is a constant.

13. The vibration damping device defined in claim 1 in which the second means is mechanical connection means mounted on an end of the inner housing for connecting said end to the second structure.

14. A vibrating damping device including:

a piston axially movable within the piston chamber and dividing said chamber into two separate fluid chambers, said piston having a piston rod extending out of said inner housing;

an outer housing surrounding at least a portion of the inner housing;

first means for connecting the piston rod to a first support structure;

second means for connecting one of the housings to a second structure spaced from the first structure, whereby a load on said damping device is supported by said one housing and the piston rod;

fluid transfer duct means formed between said inner and outer housings providing fluid communication between said fluid chambers on opposite sides of said piston, said fluid chambers adapted to be filled with an electrorheological (ER) fluid; and electrode means mounted in the transfer duct means for applying an electric field across at least a portion of the duct means to increase the flow resistance of the ER fluid passing therethrough, said electrode means being formed with a plurality of circumferentially spaced splines and intervening grooves extending longitudinally throughout at least a portion of the duct means, wherein the relationship of a circumferential width (W) of the grooves, a radial depth (D) of the grooves, a radial spacing (S) of the fluid transfer duct between the inner housing and splines, a number (N) of the grooves, and a tangential spacing of the grooves (b), is defined by the formula $NS^3 =K$ where K is a constant.

15. A vibrating damping device including:

an inner housing forming a piston chamber;

a piston axially movable within the piston chamber and dividing said chamber into two separate fluid chambers, said piston having a piston rod extending out of said inner housing;

an outer housing surrounding at least a portion of the inner housing;

first means for connecting the piston rod to a first support structure;

second means for connecting one of the housings to a second structure spaced from the first structure, whereby a load on said damping device is supported by said one housing and the piston rod;

fluid transfer duct means formed between said inner and outer housings providing fluid communication between said fluid chambers on opposite sides of said piston, said fluid chambers adapted to be filled with an electrorheological (ER) fluid; and electrode means mounted in the transfer duct means for applying an electric field across at least a portion of the duct means to increase the flow resistance of the ER fluid passing therethrough, said electrode means being formed with a plurality of circumferentially spaced splines and intervening grooves extending longitudinally throughout at least a portion of the duct means, wherein the electrode means further includes a plurality of elongated first metal strips which form the splines and a plurality of second metal strips which are mounted in a plurality of the grooves and are electrically insulated from said first strips to provide a plurality of secondary electrodes.

16. The vibration damping device defined in claim 15 in which each of the first metal strips includes an arcuate section which is spaced radially from the inner housing, and a second section which extends into a respective one of the adjacent grooves; and in which said second sections are spaced circumferentially from the second metal strips to provide a gap therebetween.

17. The vibration damping device defined in claim 15 in which the outer housing is formed of a dielectric material.

* * * * *